United States Patent [19]
Chieger

[11] 3,880,445
[45] Apr. 29, 1975

[54] INTEGRAL TRAILER SUSPENSION CROSSMEMBER SUPPORT - AIR RESERVOIR STRUCTURE

[75] Inventor: George Chieger, Birmingham, Mich.

[73] Assignee: Fruehauf Corporation, Detroit, Mich.

[22] Filed: May 10, 1974

[21] Appl. No.: 468,828

[52] U.S. Cl. .......... 280/106 R; 280/5 A; 280/150 R
[51] Int. Cl. ............................................ B62d 25/00
[58] Field of Search ............ 280/106 R, 106 T, 5 A, 280/DIG. 8, 415 B, 150 R, 150 F, 80 R, 81 R

[56] References Cited
UNITED STATES PATENTS
1,970,724   8/1934   Arnold .............................. 280/5 A
3,012,795   12/1961  Doerfler .......................... 280/106 T
3,622,178   11/1971  Tantlinger ....................... 280/106 T Primary Examiner—Philip Goodman
Assistant Examiner—John A. Carroll
Attorney, Agent, or Firm—Harness, Dickey & Pierce

[57] ABSTRACT

A vehicular wheel suspension includes a pair of transversely aligned vertical supports depending from the vehicle frame structure on opposite sides of the vehicle, a rectangular cross bracing frame structure extending transversely between and secured to said supports, and a cylindrical air tank in the cross bracing frame structure and secured thereto at spaced points to resist diamond distortion thereof under laterally imposed stesses.

5 Claims, 3 Drawing Figures

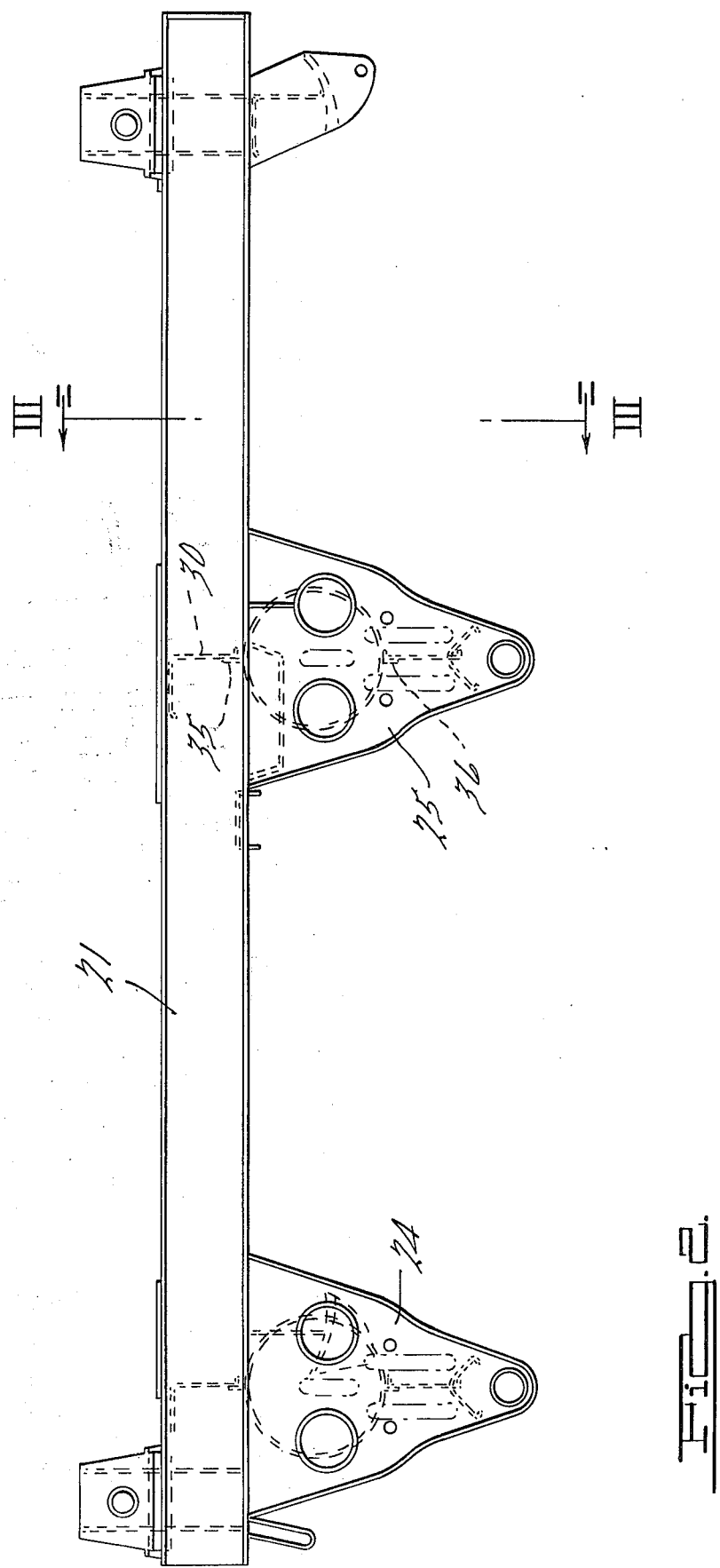

INTEGRAL TRAILER SUSPENSION CROSSMEMBER SUPPORT - AIR RESERVOIR STRUCTURE

BACKGROUND OF THE INVENTION

In the design of cargo carrying road vehicles, such as semi-trailers, it is desirable to minimize weight to as great an extent as is practicable without sacrificing durability, in order to maximize the payload while remaining within gross vehicle weight limits. When rounding curves at high speeds, heavily loaded vehicles impose high lateral stresses on the running gear components, so that strong lateral bracing is required. Failures with serious consequences have resulted when, for example, a heavily loaded vehicle is forced to swerve suddenly to avoid an accident.

The overall objective of the present invention is to provide improved extremely rigid transverse bracing of the running gear of such a vehicle while minimizing gross vehicle weight.

A more specific object is to utilize structurally in a unique manner the air storage tank or tanks with which such vehicles are normally equipped, the tanks being so incorporated into the suspension structure as to greatly strengthen its resistance to lateral forces, the tanks being nevertheless readily accessible, and located close to air-actuated brake mechanism.

A further object is to provide such an improved suspension structure and air storage means which is of lower cost as well as lower weight than known alternative constructions despite its increased rigidity.

Other objects and advantages of the present invention will become apparent upon consideration of the present disclosure in its entirety.

BRIEF DESCRIPTION OF THE FIGURES OF DRAWING

FIG. 2 is a fragmentary side elevational view of the side frame and rear suspension supporting components of the semi-trailer.

DETAILED DESCRIPTION OF THE PREFERRED FORM OF THE INVENTION

Figure 1:
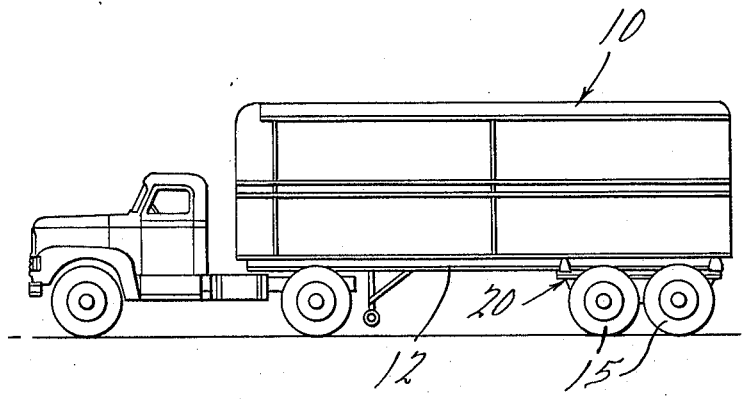
FIG. 1 is a side elevation of a tractor-semi-trailer combination typical of an environment wherein this invention is usefully employed.
Figure 3:
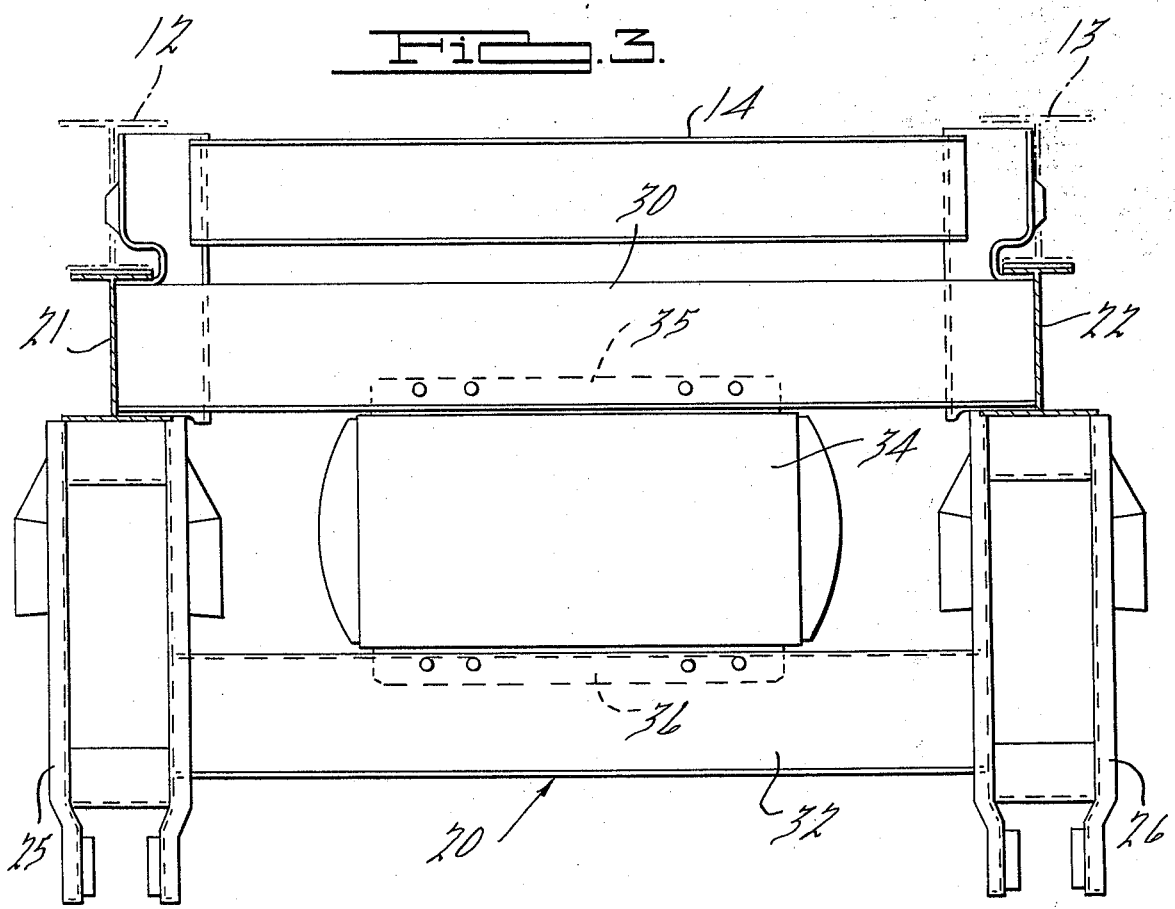
FIG. 3 is a cross section taken substantially on the line III—III of FIG. 2 and looking in the direction of the arrows.

Reference character 10 designates generally the body of a semi-trailer illustrated as typifying a load-carrying vehicle to which the invention can advantageously be applied. The semi-trailer, as is usual, has longitudinal side rails 12, 13 forming the principal components of the main frame structure and which is stiffened by suitable transverse braces as 14. The trailer suspension consists of tandem wheels 15 which are carried by a subframe assembly generally designated 20. The subframe assembly comprises a pair of longitudinal I-beams 21, 22 which as best shown in FIG. 3 may correspond in cross section to the frame rails 12, 13. The I-beams 21, 22 are secured to the bottoms of the rails 12, 13 on each side of the vehicle near the rear. A pair of longitudinally spaced depending wheel and spring supporting members 24, 25 is secured as by welding to the bottom of each of the rails 12, 13, suitable suspension components (not shown) for the wheels 15 being attached to the supports 24, 25 in known manner. Such components typically consist of leaf springs (not shown), radius rods (not shown), and dead axles (not shown) upon the ends of which the wheels are journaled. All of such components of the suspension itself are well known in the art and require no detailed description.

In opposed alignment with each of the vertical wheel supports 24, 25 is a second wheel support on the opposite side of the vehicle, only one of which is shown, designated 26. Each of the oppositely aligned pairs of supports, as 25, 26, forms the side elements of a transverse stiffening frame structure. The stiffening frame structures are alike and description of one will suffice. A transverse horizontal frame member 30 extends between and at its ends is rigidly secured as by welding to the I-beams 21, 22. At a lower position and as close to the bottoms of vertical supports 25, 26 as practicable, a second transverse bracing member 32 extends horizontally between and is rigidly secured at its ends to the opposed supports 25, 26.

In vertical alignment with and arranged between the cross bracing members 30, 32 is a generally cylindrical tank 34 which, like the structural elements, is preferably formed of relatively heavy gauge steel. At diametrically opposed positions along the top and bottom wall of the tank and rigidly secured thereto are coplanar longitudinally extending flanges 35, 36. The upper flange 35 is rigidly secured to the cross member 30 and the lower flange 36 is rigidly secured to the lower cross member 32. The flanges and securing means therefor are also of heavy construction and all of the parts are rigidly integrated so that lateral forces exerted on the wheel supports 25, 26 such as are imposed when the vehicle is cornering, are effectively resisted and the bracing effect is greatly augmented by the body of the tank 34.

This Detailed Description of the Preferred Form of the Invention, and the accompanying drawings, have been furnished in compliance with the statutory requirement to set forth the best mode contemplated by the inventor of carrying out the invention. The prior portions consisting of the "Abstract of the Disclosure" and the "Background of the Invention" are furnished without prejudice to comply with administrative requirements of the Patent Office.

What is claimed is:

1. A combined wheel suspension and air reservoir support structure for a road vehicle comprising in combination with a frame having spaced generally parallel side rails extending longitudinally of the vehicle, a transversely extending cross brace member rigidly secured to and joining said side rails, a pair of vertically extending wheel supports, one extending downwardly from each juncture of said cross brace member with one of said side rails and also rigidly secured with respect to said rails and cross brace member, a second cross brace member extending transversely between and rigidly joined to said wheel supports spacedly below and in the same vertical plane as and parallel to the first-mentioned cross brace member, a rigid tank having a cylindrical body of a diameter slightly less than the vertical distance between said cross brace members, and positioned therebetween with its axis parallel to and in said same vertical plane as said cross brace members, and means joining the body of the tank to both of said cross brace members throughout substantially the full length of the top and bottom of the tank.

2. The combination set forth in claim 1 wherein the vertical spacing between said cross brace members and the diameter of the tank are equal to at least one-eighth the distance between said wheel supports.

3. The combination set forth in claim 1 wherein the length of the tank is not less than one-fourth the distance between said wheel supports.

4. The combination set forth in claim 1 wherein the vertical spacing between said cross brace members and the diameter of the tank are equal to at least one-fourth the distance between said wheel supports, and the length of the tank is not less than half the distance between said wheel supports.

5. A combination as set forth in claim 1 wherein the means joining the tank to the cross brace members comprises a pair of vertical coplanar diametrically opposed flanges one secured to the top and the other to the bottom portion of the tank body.

* * * * *